(12) United States Patent
Rouaud

(10) Patent No.: US 7,020,158 B2
(45) Date of Patent: Mar. 28, 2006

(54) METHODS AND APPARATUS FOR THE HARDWARE IMPLEMENTATION OF VIRTUAL CONCATENATION AND LINK CAPACITY ADJUSTMENT OVER SONET/SDH FRAMES

(75) Inventor: Christophe Rouaud, Toulouse (FR)

(73) Assignee: Transwitch Corporation, Shelton, CT (US)

( * ) Notice: Subject to any disclaimer, the term of this patent is extended or adjusted under 35 U.S.C. 154(b) by 0 days.

(21) Appl. No.: 10/900,737

(22) Filed: Jul. 28, 2004

(65) Prior Publication Data

US 2005/0008042 A1 Jan. 13, 2005

Related U.S. Application Data

(63) Continuation-in-part of application No. 10/323,442, filed on Dec. 18, 2002.

(51) Int. Cl.
*H04J 3/16* (2006.01)

(52) U.S. Cl. .......................... 370/465; 370/907
(58) Field of Classification Search ................ 370/465, 370/509, 532–536, 907, 503
See application file for complete search history.

(56) References Cited

U.S. PATENT DOCUMENTS

| | | | |
|---|---|---|---|
| 5,461,622 A | 10/1995 | Bleickardt et al. | 370/84 |
| 5,615,237 A | 3/1997 | Chang et al. | 375/368 |
| 5,777,998 A | 7/1998 | Traverso et al. | 370/509 |
| 6,381,328 B1 | 4/2002 | Morton et al. | 379/221.08 |
| 6,636,529 B1 | 10/2003 | Goodman et al. | 370/469 |
| 6,667,989 B1 | 12/2003 | Sekii et al. | 370/465 |
| 6,697,373 B1 | 2/2004 | Sandstrom | 370/405 |
| 6,700,900 B1 | 3/2004 | Turban | 370/465 |

OTHER PUBLICATIONS

*Synchronous Digital Hierarchy Bit Rates*, CCITT Recommendation G.707, International Telecommunication Union, Geneva, 1991.
*Synchronous Frame Structures Used at 1544, 6312, 2048, 8448 and 44 736 kbit/s Hierarchical Levels*, ITU-T Recommendation G.704, International Telecommunication Union, Oct. 1998.
*Generic Framing Procedure (GFP): The Catalyst for Efficient Data over Transport*; Emerging Data over SONET/SDH (DoS) Standards and Technology; by Paul Bonenfant and Antonio Rodriguez-Moral, Photuris, Inc.; May, 2002; IEEE.

*Primary Examiner*—Andy Lee
(74) *Attorney, Agent, or Firm*—Gordon & Jacobson, P.C.

(57) ABSTRACT

The methods of the invention include providing a state machine on chip with a SONET/SDH mapper and providing means whereby a plurality of members of a VCG can share the same state machine. The apparatus of the invention preferably includes a "smart" time wheel for granting access to the single state machine and memory for storing state information for each of the VCG members. A TCM (transmit configuration management) block is provided which interrelates the state change of one member with all of the other members of the VCG by reference to a plurality of status registers, one for each member of the VCG. The TCM block includes a single module which is shared by all VCG members. The "smart" time wheel is connected not only to the shared state machine but also to the single TCM module and the status and configuration registers.

20 Claims, 4 Drawing Sheets

METHODS AND APPARATUS FOR THE HARDWARE IMPLEMENTATION OF VIRTUAL CONCATENATION AND LINK CAPACITY ADJUSTMENT OVER SONET/SDH FRAMES

This application is a continuation-in-part of application Ser. No. 10/323,442, filed Dec. 18, 2002, the complete disclosure of which is incorporated herein by reference. In addition, all of the publicly available industry standards mentioned herein are also incorporated by reference.

BACKGROUND OF THE INVENTION

1. Field of the Invention

The invention relates to telecommunications, the Synchronous Optical Network (SONET) and the Synchronous Digital Hierarchy (SDH). More particularly, the invention relates to methods for performing virtual concatenation and link capacity adjustment in hardware.

2. State of the Art

The Synchronous Optical Network (SONET) or the Synchronous Digital Hierarchy (SDH), as it is known in Europe, is a common telecommunications transport scheme which is designed to accommodate both DS-1 (T1) and E1 traffic as well as multiples (DS-3 and E-3) thereof. A DS-1 signal consists of up to twenty-four time division multiplexed DS-0 signals plus an overhead bit. Each DS-0 signal is a 64 kb/s signal and is the smallest allocation of bandwidth in the digital network, i.e. sufficient for a single telephone connection. An E1 signal consists of up to thirty-two time division multiplexed DS-0 signals with at least one of the DS-0s carrying overhead information.

Developed in the early 1980s, SONET has a base (STS-1) rate of 51.84 Mbit/sec in North America. The STS-1 signal can accommodate 28 DS-1 signals or 21 E1 signals or a combination of both. The basic STS-1 signal has a frame length of 125 microseconds (8,000 frames per second) and is organized as a frame of 810 octets (9 rows by 90 byte-wide columns). It will be appreciated that 8,000 frames*810 octets per frame*8 bits per octet=51.84 Mbit/sec. The frame includes the synchronous payload envelope (SPE) or virtual container (VC) as it is known in Europe, as well as transport overhead. Transport overhead is contained in the first three columns (27 bytes) and the SPE/vC occupies the remaining 87 columns.

In Europe, the base (STM-1) rate is 155.520 Mbit/sec, equivalent to the North American STS-3 rate (3*51.84=155.520). The STS-3 (STM-1) signals can accommodate 3 DS-3 signals or 63 E1 signals or 84 DS-1 signals, or a combination of them. The STS-12 signals are 622.080 Mbps and can accommodate 12 DS-3 signals, etc. The STS-48 signals are 2,488.320 Mbps and can accommodate 48 DS-3 signals, etc. The highest defined STS signal, the STS-768, is nearly 40 Gbps (gigabits per second). The abbreviation STS stands for Synchronous Transport Signal and the abbreviation STM stands for Synchronous Transport Module. STS-n signals are also referred to as Optical Carrier (OC-n) signals when transported optically rather than electrically.

To facilitate the transport of lower-rate digital signals, the SONET standard uses sub-STS payload mappings, referred to as Virtual Tributary (VT) structures. (The ITU calls these structures Tributary Units or TUs.) This mapping divides the SPE (VC) frame into seven equal-sized sub-frames or VT (TU) groups with twelve columns of nine rows (108 bytes) in each. Four virtual tributary sizes are defined as follows.

VT1.5 has a data transmission rate of 1.728 Mb/s and accommodates a DS1 signal with overhead. The VT1.5 tributary occupies three columns of nine rows, i.e. 27 bytes. Thus, each VT Group can accommodate four VT1.5 tributaries.

VT2 has a data transmission rate of 2.304 Mb/s and accommodates a CEPT-1 (E1) signal with overhead. The VT2 tributary occupies four columns of nine rows, i.e. 36 bytes. Thus, each VT Group can accommodate three VT2 tributaries.

VT3 has a data transmission rate of 3.456 Mb/s) and accommodates a DS1C (T2) signal with overhead. The VT3 tributary occupies six columns of nine rows, i.e. 54 bytes. Thus, each VT Group can accommodate two VT3 tributaries.

VT6 has a data transmission rate of 6.912 Mb/s and accommodates a DS2 signal with overhead. The VT6 tributary occupies twelve columns of nine rows, i.e. 108 bytes. Thus, each VT Group can accommodate one VT6 tributary.

As those skilled in the art will appreciate, the original SONET/SDH scheme as well as the VT mapping schemes were designed to carry known and potentially foreseeable TDM (time division multiplexed) signals. In the early 1980s these TDM signals were essentially multiplexed telephone lines, each having the (now considered) relatively small bandwidth of 56–64 kbps. At that time, there was no real standard for data communication. There were many different schemes for local area networking and the wide area network which eventually became known as the Internet was based on a "56 kbps backbone". Since then, Ethernet has become the standard for local area networking. Today Ethernet is available in four bandwidths: the original 10 Mbps system, 100 Mbps Fast Ethernet (IEEE 802.3u), 1,000 Mbps Gigabit Ethernet (IEEE 802.3z/802.3ab), and 10 Gigabit Ethernet (IEEE 802.3ae).

In recent years it has been recognized that SONET/SDH is the most practical way to link high speed Ethernet networks over a wide area. Unfortunately, the various Ethernet transmission rates (10 Mbps, 100 Mbps, 1,000 Mbps, and 10,000 Mbps) do not map well into the SONET/SDH frame. For example, the original 10 Mbps Ethernet signal is too large for a VT-6 tributary (6.912 Mbps) but too small for an entire STS-1 (51.84 Mbps). In other words, under the existing SONET/SDH schemes, in order to transport a 10 Mbps Ethernet signal, an entire STS-1 path must be used, thereby wasting a significant amount of bandwidth. Similar results occur when attempting to map the faster Ethernet signals into STS signals.

In order to provide a scheme for efficiently mapping Ethernet signals (as well as other signals such as Fiber Channel and ESCON) into a SONET/SDH frame, the Virtual Concatenation Protocol was created and has been endorsed by the ITU as the G.707 standard. Similar to inverse multiplexing, Virtual Concatenation combines multiple links (members) into one Virtual Concatenation Group (VCG), enabling the carrier to optimize the SDH/SONET links for Ethernet traffic. For example, using virtual concatenation, five VT-2 (2 Mbps) links can be combined to carry a 10 Mbps Ethernet signal, resulting in full utilization of allotted bandwidth. Two STS-1 (51 Mbps) links can be combined to carry a 100 Mbps Ethernet signal, etc. Virtual Concatenation uses SONET/SDH overhead bytes (four of the sixteen "H4" bytes) to indicate two numbers: the multiframe indicator (MFI) and the sequence number (SQ).

Part of the emerging Virtual Concatenation Protocol includes methods for dynamically scaling the available bandwidth in a SONET/SDH signal. These methods are known as the Link Capacity Adjustment Scheme or LCAS. LCAS is a powerful network management tool because customer bandwidth requirements change over time. One simple example is a network user who, during business hours, needs only enough bandwidth to support electronic mail and worldwide web access. During non-working hours, however, the same network user may wish to conduct relatively large data transfers from one location to another to backup daily transactions, for example. It would be desirable to alter the user's available bandwidth as needed. LCAS provides a means to do this without disturbing other traffic on the link. LCAS has been endorsed by the ITU as the G.7042 standard which is hereby incorporated by reference herein in its entirety.

While Virtual Concatenation is a simple labeling protocol, LCAS requires a two-way handshake (using seven of the sixteen H4 bytes for high order, STS-1, and seventeen of the thirty-two K4 bits for low order, VT1.5). Status messages are continually exchanged and actions are taken based on the content of the messages. For example, to provide high order (STS-1) virtual concatenation, each STS-1 signal carries one of six LCAS control commands which are described as follows:

"Fixed"—LCAS not supported on this STS-1;

"Add"—Request to add this STS-1 to a VCG, thereby increasing the bandwidth of an existing VCG or creating a new VCG;

"Norm"—This STS-1 is in use;

"EOS"—This STS-1 is in use and is the last STS-1 of this VCG, i.e. the STS-1 with the highest SQ number;

"Idle"—This STS-1 is not part of a VCG or is about to be removed from a VCG;

"Do not use"—This STS-1 is supposed to be part of a VCG, but does not transport payload due to a broken link reported by the destination.

The LCAS protocol as defined in ITU-T G.7042 requires that a finite state machine be provided for each member of a VCG to maintain the control command (state) for each member. This can be a substantial chore. For example, to provide low order (VT1.5) virtual concatenation within an STS-3 signal, eighty-four state machines must be provided, one for each VT1.5.

State of the art SONET/SDH mapping is performed on the chip level with some external support from a microprocessor. The mapper chip may contain all of the apparatus needed for mapping but not for provisioning. Provisioning is provided by an attached microprocessor, e.g. a UNIX workstation. A SONET/SDH switch may include many mapper chips and be coupled to a single workstation which controls provisioning. This workstation is also referred to as the NMS (network management system). Historically, SONET/SDH provisioning was performed infrequently and manually by a person operating the workstation attached to the switch. With the advent of LCAS, however, provisioning must be performed more frequently and automatically. Since one workstation is responsible for controlling many mapper chips in a switch, it is necessary to implement many state machines (one for each member of each VCG) in the workstation. This can become quite a burden on the workstation to maintain hundreds, perhaps thousands of state machines.

It would be desirable to relieve the workstation from the task of maintaining so many state machines, but implementing the state machines in hardware is costly and would require additional chips.

The above-incorporated parent application discloses a method of providing a state machine on a chip with a SONET/SDH mapper and providing means whereby a plurality of members of a VCG can share the same state machine. The apparatus of the parent application preferably includes a time wheel for granting access to the single state machine and memory for storing state information for each of the VCG members. A TCM (transmit configuration management) block is provided which interrelates the state change of one member with all of the other members of the VCG by reference to a plurality of status registers, one for each member of the VCG. The TCM block includes a submodule for each VCG member. Each submodule receives the VCG#, CTRL word, SQ numbers and Pool value from the state machine. It also receives the previous configuration for the current member of the VCG as well as the configuration of the other affected members of the VCG from the status registers. With this information, it generates new configuration information VCG#, CTRL word, SQ numbers and Pool value for member n (as well as for the other affected members) which is stored in the status registers. An exemplary apparatus is implemented on-chip with an OC-3 Ethernet mapper. Thus, up to eighty-four VCG members share the same state machine and memory is provided on the chip for maintaining the state information for eighty-four VCG members. According to the exemplary embodiment, fifteen bits are used to store the state information for each VCG member in low order and seventeen bits are used to store the state information for each VCG member in high order. In the exemplary embodiment, the time wheel runs at 20 MHz.

Since the filing of the parent application, it has become desirable to implement the apparatus on a chip with an OC-12 Ethernet mapper. This would require scaling the logic circuitry of the apparatus of the parent application to accommodate three hundred thirty-six VCG members. In doing this, the size and density of the circuitry becomes relatively large and the layout becomes difficult.

SUMMARY OF THE INVENTION

It is therefore an object of the invention to provide methods and apparatus for the hardware implementation of virtual concatenation and link capacity adjustment.

It is also an object of the invention to provide methods and apparatus for the hardware implementation of virtual concatenation and link capacity adjustment which are relatively inexpensive.

It is another object of the invention to provide methods and apparatus for the hardware implementation of virtual concatenation and link capacity adjustment which do not require additional chips.

It is also an object of the invention to provide methods and apparatus for the hardware implementation of virtual concatenation and link capacity adjustment which use logic circuits of reduced size.

It is an additional object of the invention to provide methods and apparatus for the hardware implementation of virtual concatenation and link capacity adjustment which use logic circuits of low density.

It is still another object of the invention to provide methods and apparatus for the hardware implementation of virtual concatenation and link capacity adjustment which use logic circuits having a relatively simple layout.

In accord with these objects, which will be discussed in detail below, the methods of the invention include providing a state machine on chip with a SONET/SDH mapper and providing means whereby a plurality of members of one or more VCGs can share the same state machine. The apparatus of the invention preferably includes a time wheel for granting access to the single state machine and memory for storing state information for each of the members of each VCG. A TCM (transmit configuration management) block is provided which interrelates the state change of one member with all of the other members of a VCG by reference to a plurality of status registers, one for each member of the VCG. The TCM block includes a single module which is shared by all VCG members. The time wheel is connected not only to the shared state machine but also to the single TCM module and to the status and configuration registers with different delays.

According to the invention, a single TCM module which is shared by all VCG members. It takes N cycles (where N is the maximum possible number of VCG members) to apply changes to an entire VCG even when only one member's configuration is modified. The time wheel prevents conflicting access to status registers while providing simultaneous reading and writing of the status registers. In the exemplary embodiment, the time wheel runs at 77.76 MHz.

Additional objects and advantages of the invention will become apparent to those skilled in the art upon reference to the detailed description taken in conjunction with the provided figures.

DETAILED DESCRIPTION OF THE PREFERRED EMBODIMENTS

Figure 1:
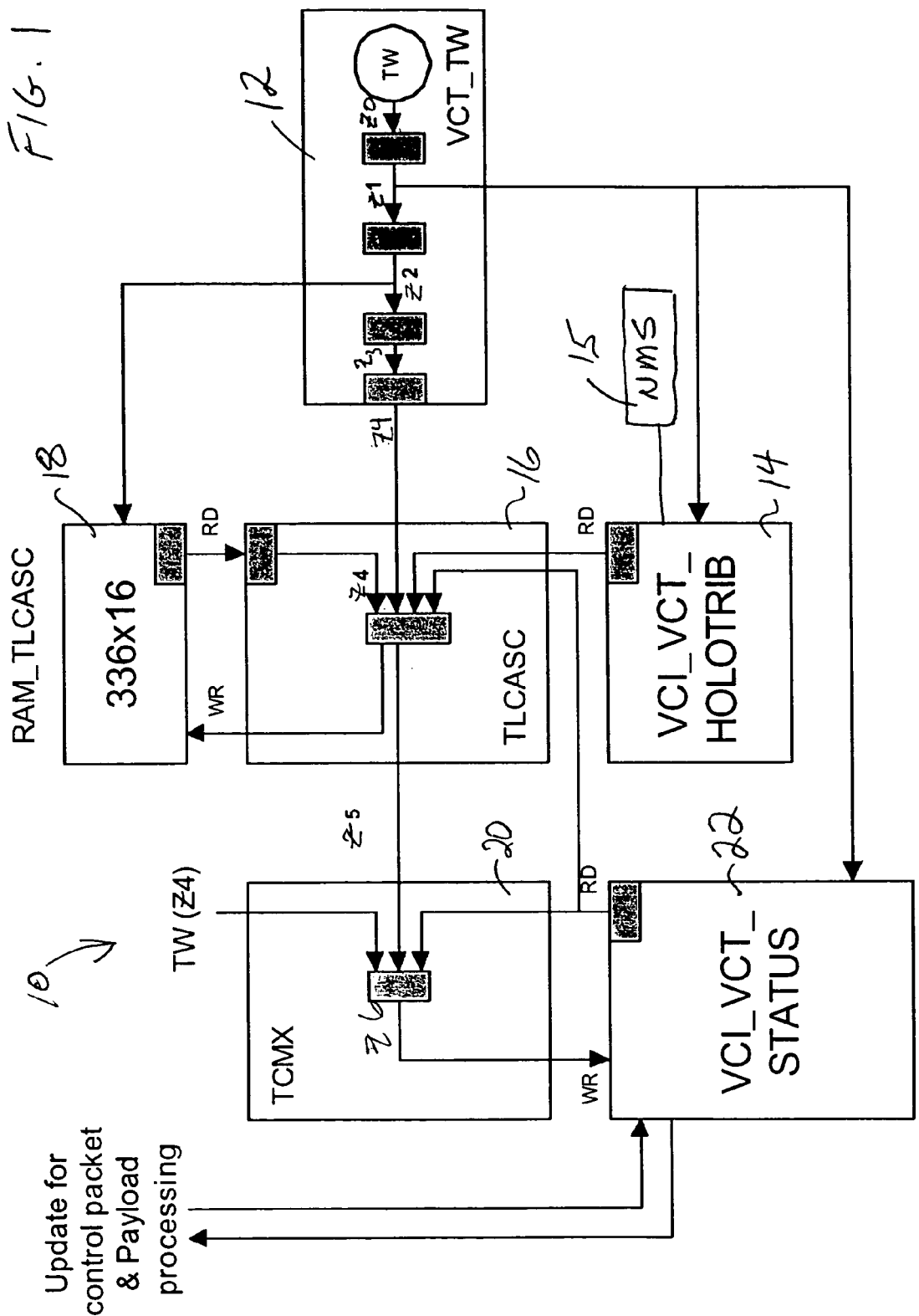
FIG. 1 is a high level schematic illustration of an LCAS processing block according to the invention.

Turning now to FIG. 1, an LCAS processing block 10 according to the invention includes a time wheel block 12 (VCT_TW), a configuration register 14 (VCI_VCT_HOLOTRIB), a shared state machine 16 (TLCASC) with an associated 336×16 bit RAM 18 (RAM_TLCASC), a transmit configuration management block 20 (TCMX), and transmit status registers 22 (VCI_VCT STATUS). In the exemplary embodiment, the time wheel runs at 77.76 MHz. The time wheel block 12 includes a time wheel TW having several delay blocks which are shown as shaded boxes in FIG. 1. Delay blocks are also provided in the other components. Depending on how the components are coupled to the time wheel and each other, in the presently preferred embodiment, from one to five delays may be interposed between the time wheel and a particular component. For example, a one block delay (preferably one clock cycle) is provided between the time wheel 12 and the registers 14 and 22. A two block delay is provided between the time wheel and the RAM 18. A four block delay is provided between the time wheel 12 and the state machine 16 as well as between the time wheel 12 and the configuration management block 20 (see TW(Z4)).

The registers 14 (VCI_HOLOTRIB) contain member allocation among high order and low order tributaries. The registers 22 (VCI_VCT_STATUS) contain the current state and VCG allocation of the tributaries. The RAM 18 (RAM_TLCASC) contains the current state information for each of up to three hundred thirty-six VCG members. The "output" of the circuit 10 is the content of the registers 22 (VCI_VCT_STATUS) which are read by the control packet and payload processing block which is illustrated in FIG. 2.

Figure 2:
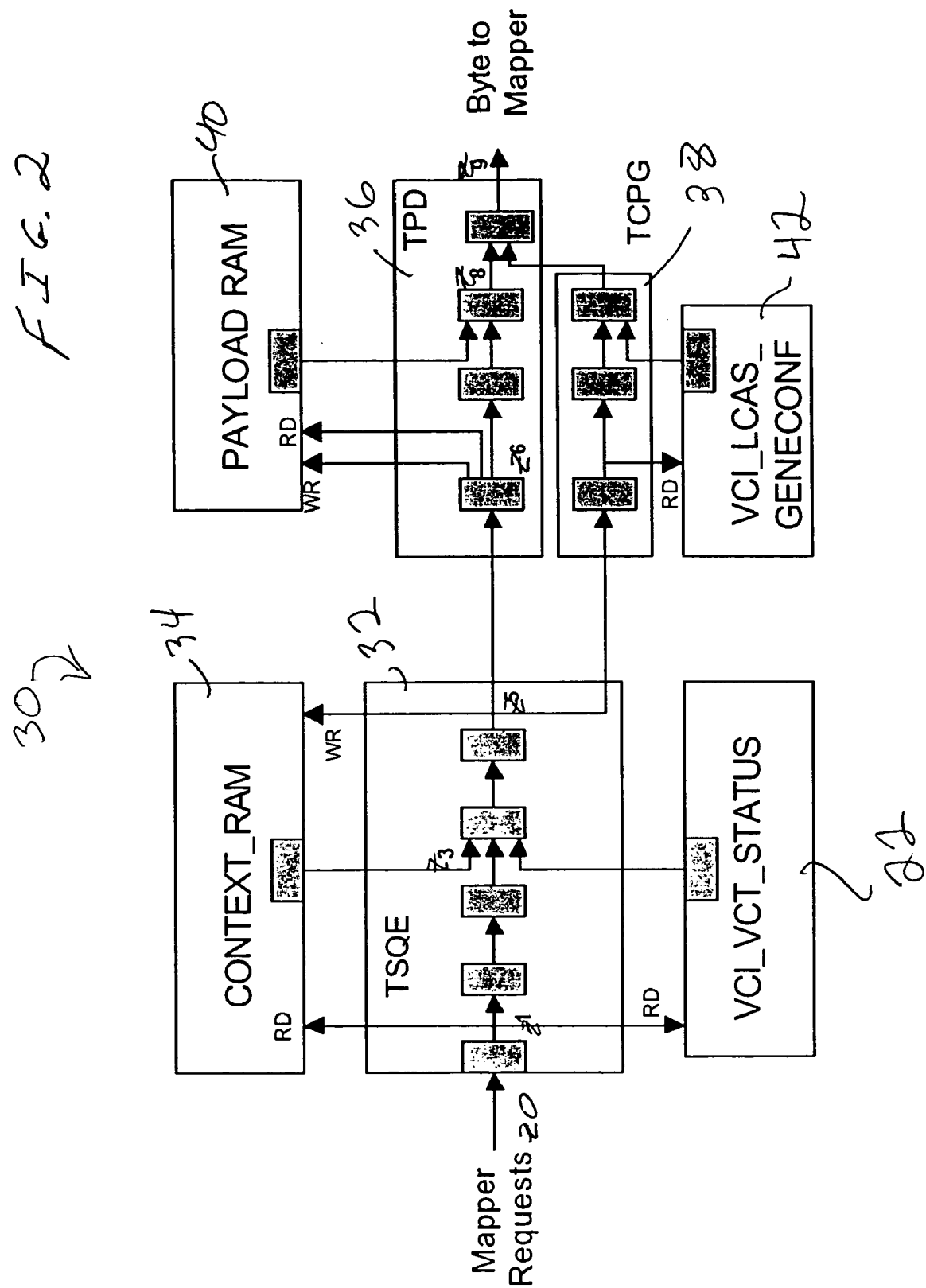
FIG. 2 is a high level schematic illustration of a control packet and payload processing block according to the invention.

Referring now to FIG. 2, the registers 22 (VCI_VCT_STATUS) are coupled to a transmit sequencer 32 (TSQE) which is provided with associated RAM 34 (CONTEXT_RAM). The sequencer 32 extracts the context from the status registers 22 once each control packet (i.e. every 2 or 16 ms) and stores it in context RAM 34. Between control packets, the sequencer generates signals to drive the transmit payload demultiplexer 36 (TPD) and the transmit control packet generator 38 (TCPG). The TPD sends bytes of payload to the payload RAM 40 (from an encapsulation block, not shown) on each mapper request. The TCPG sends a part of the control packet on each mapper request. The TCPG is coupled to the general configuration register 42 (VCI_LCAS_GENECONF).

Referring now to both FIGS. 1 and 2, the time-wheel 12 is used to access configuration information for each tributary, and as described above, is provided with different delays to the blocks responsible for LCAS processing. The context located in VCI_VCT_STATUS block 22 is shared between LCAS processing (FIG. 1) and control packet processing (FIG. 2) which operate on different time-wheels. Because the transmit sequencer (TSQE) 32 is working on mapper frames timing, the TSQE 32 update procedure has priority over LCAS processing. So, when the TSQE 32 is requesting an update of context (located in the VCI_VCT_STATUS block 22), the LCAS processing is stopped to allow the TSQE 32 to read the last completed context. The TSQE 32 only accesses the VCI_VCT_STATUS block 22 once every control packet (i.e., every 2 ms or 16 ms, depending on high order or low order). The rest of the time, the VCI_VCT_STATUS block 22 is available for LCAS processing.

Turning back to FIG. 1, the independent components will be described in more functional detail. The VCI_VCT_HOLOTRIB registers 14 are accessible by the network management system (NMS) 15. This is where each tributary is assigned a pool location, VCG number and sequence number. The pool location designations include global, non-LCAS, LCAS-IDLE, and LCAS-ADD. The VCG number is not used when a member remains in the global pool. The SQ (sequence number) fields stored in the VCI_VCT_HOLOTRIB registers 14 are only those used for members in the non-LCAS pool. SQ numbers for LCAS members are generated (assigned) by the TLCASC block 16.

The TLCASC state machine 16 applies the NMS commands extracted from the VCI_VCT_HOLOTRIB block. All members are treated one after the other, following indexes provided by VCT_TW block 12 as described in more detail below with reference to the timing diagrams. A single finite state machine (FSM) is provided, using context switching methods like those described in the previously incorporated parent application. The RAM_TLCASC 18 stores the following information for each member: LCAS state (3 bits) and Time Out 1 value (10 bits) which enables a time out of up to 1024 ms for an ADD request. For each VCG member, the TLCASC state machine 16 receives NMS requests (from VCI_VCT_HOLOTRIB 14), MST/RS_ACK (extracted from received control packets) and previous status information (from RAM_TLCASC 18 and VCI_VCT_STATUS 22) and generates two sets of outputs to the TCMX block 20, i.e., the previous and new context for the concerned member. The previous context parameters are illustrated in Table 1 and the new context parameters are illustrated in Table 2.

TABLE 1

| Name | I/O | Size | Description |
| --- | --- | --- | --- |
| TLCASC_Old_VCG | O | 3 bits | Old VCG value |
| TLCASC_Old_CTRL | O | 4 bits | Old CTRL value |
| TLCASC_Old_CP_SQ | O | 8 bits | Old SQ value for Control Packet |
| TLCASC_Old_PL_SQ | O | 6 bits | Old SQ value for Payload processing |
| TLCASC_Old_LCAS | O | 1 bit | '1' if member was already in LCAS pool |

TABLE 2

| Name | I/O | Size | Description |
| --- | --- | --- | --- |
| TCMX_Cmd_Enable | O | 1 bit | '1' if new VCAT/LCAS values available |
| TCMX_Cmd_Member | O | 9 bits | Tributary number of member modified |
| TCMX_Cmd_VCG | O | 3 bits | New VCG value |
| TCMX_Cmd_CTRL | O | 4 bits | New CTRL value |
| TCMX_Cmd_CP_SQ | O | 8 bits | New SQ value for Control Packet |
| TCMX_Cmd_PL_SQ | O | 6 bits | New SQ value for Payload processing |

The LCAS process is initiated in several ways: if a pool value is modified for any tributary, if the SQ value of a non-LCAS member is modified, or if the LCAS state, CTRL value, or SQ value of an LCAS member is changed. Note that the previous context values are only updated when TLCASC changes the new context. Otherwise, the TCMX_Cmd_Enable signal remains off. This reduces power consumption since the TDCMX block only operates when a modification of context is needed.

In the case of non-LCAS members, the TLCASC block 16 simply copies the parameters from the VCI_VCT_HOLOTRIB registers 14 to the TCMX block 20. In the case of LCAS members, the TLCASC block 16 takes NMS and MST/RS_ACK commands and uses these commands with the member's previous state information taken from the RAM_TLCASC 18 to generate new state and status values according to the G.7042 specification.

In order to assign an SQ number and CTRL word for each member at each FSM transition, the TLCASC block 16 maintains four counters (not shown) for each member. These counters are listed in Table 3.

TABLE 3

| Name | Description |
| --- | --- |
| VCG_CP_Size | number of members provisioned in LCAS_ADD pool for that VCG |
| VCG_PL_Size | number of provisioned containers carrying payload |
| VCG_IDLE_Size | number of members in LCAS_IDLE pool |
| VCG_EOS_Pos | CP_SQ value of member carrying EOS |

As mentioned above and discussed in the previously incorporated parent application, the TLCASC block state machine alters the LCAS state and parameters for individual VCG members, but does not make any alterations in state and parameters of other affected members of the same VCG. The TCMX block 20, on the other hand, assures that all of the members of each VCG have the proper state and parameters. The TCMX block 20 sequentially treats the context of each member of each VCG by reading the latest context information for all members of all the VCGs from the VCI_VCT_STATUS block 22 while receiving new context and previous context information for each modified member from the TLCASC block 16. Using these three pieces of information, the TCMX block 20 sequentially rewrites context information for all members to the VCI_VCT_STATUS block until all the individual member information from the TLCASC block has been processed. Alterations to non-LCAS VCGs (e.g., set up and tear down) do not require consideration by the TCMX block because all members of the VCG are added or deleted simultaneously.

The foregoing description may be better understood with the use of an example. As an example, for an STS-12 signal having up to 336 virtual tributaries (i.e., N=336), assume that there are several different VCGs being handled by the mapper, that all of these VCGs are subject to LCAS and that the total number of members belonging to all these VCGs is three hundred (i.e. X=300). Assume further that commands are received by the TLCASC (either from VCI_VCT_HOLOTRIB or from received control packets) to alter sixteen members of the VCGs. This may include increasing the number of members in some VCGs and/or decreasing the number of members in some VCGs. TLCASC provides TCMX with the prior and new context for the first of the sixteen members while TCMX reads the current context for all N=336 members from the VCI_VCT_STATUS block. The TCMX determines which of the three hundred thirty-six members need to have a change in context due to the change in context of the first member and re-writes the VCI_VCT_STATUS block accordingly, changing the context of the first member and all other members which need to be changed. TLCASC then provides TCMX with the prior and new context for the second of the sixteen members while TCMX reads the current context for all N=336 members from the VCI_VCT_STATUS block. The process repeats until all of the sixteen member changes have been treated by the TCMX.

Figure 3:
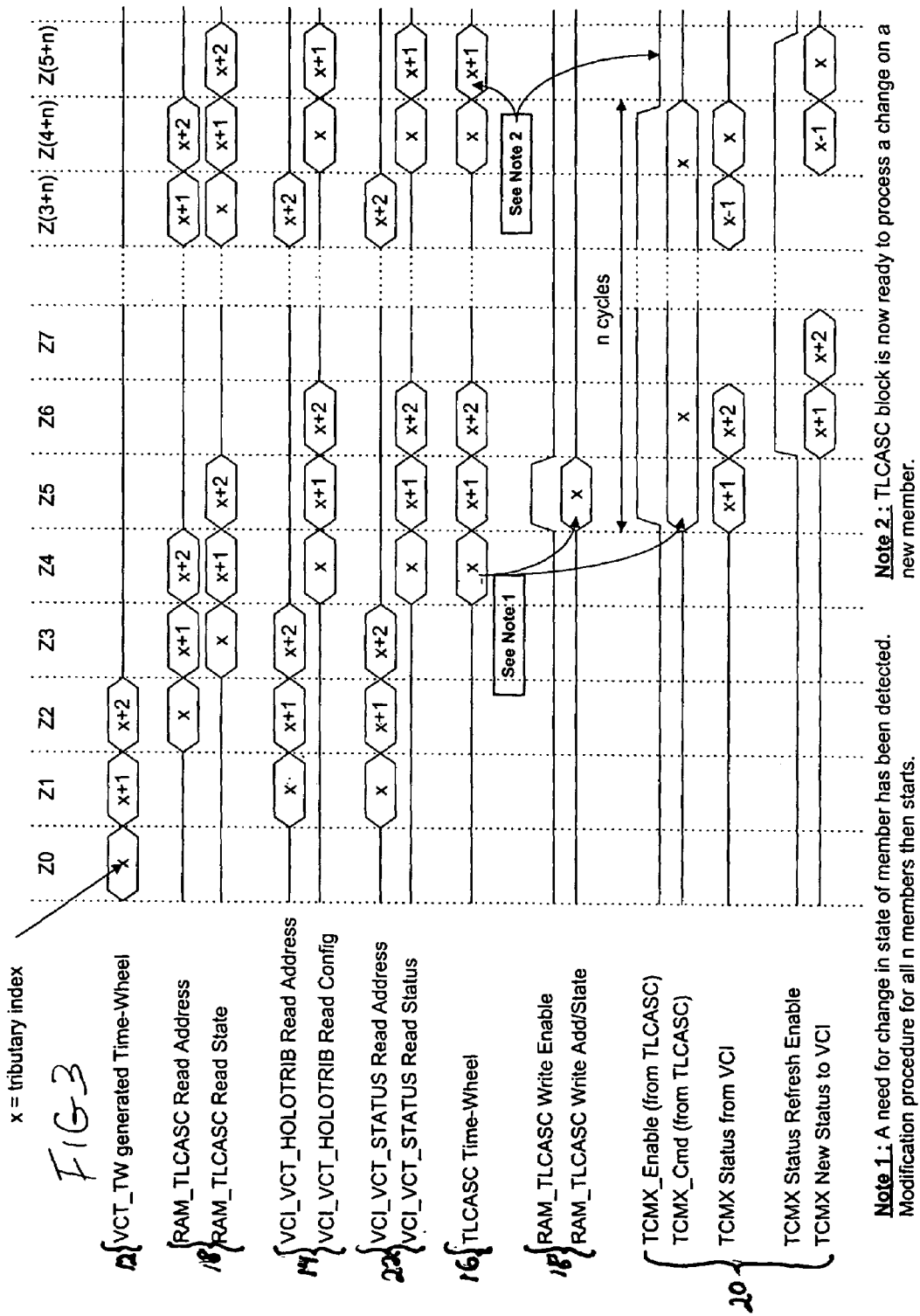
FIG. 3 is a timing diagram of the LCAS process.

FIG. 3 illustrates the timing of the LCAS operation described above with reference to FIG. 1. In FIG. 3, the columns Z0 through Z6 relate to the block delays shown in FIG. 1. Starting at Z0, the time wheel VCT_TW calls for treating the first VCG member "x". The read address for information for this member is applied to VCI_VCT_HOLOTRIB and VCI_VCT_STATUS at time Z1 while the time wheel is calling for treating the next member x+1.

At time Z2, the read address for information for member x+1 is applied to VCI_VCT_HOLOTRIB and VCI_VCT_STATUS while the time wheel is calling for treating the next member x+2. Simultaneously at Z2, the read address for information about the prior state of member x is applied to RAM_TLCASC.

At Z3, while the time wheel is calling for treating member x+3, the prior state of member n is read from RAM_TLCASC while the read address for information about the prior state of member x+1 is applied to RAM_TLCASC and the read address for information for member x+2 is applied to VCI_VCT_HOLOTRIB and VCI_VCT_STATUS.

At time Z4, while the time wheel is calling for treating member x+4, the prior state of member x+1 is read from RAM_TLCASC while the read address for information about the prior state of member x+2 is applied to RAM_TLCASC, the configuration and status regarding member x are read from VCI_VCT_HOLOTRIB and VCI_VCT_STATUS, respectively. At this time Z4, the TLCASC receives a time wheel pulse and detects the need for a change in state of member x based on VCI_VCT_HOLOTRIB content, MST/RS_ACK value and internal state from RAM_TLCASC. When the TLCASC detects the need for a change in member x, it waits N cycles for all members to be treated, where N is the total number of tributaries. During these N cycles the TLCASC outputs remain stable.

At time Z5, TLCASC has already read the prior states for members x and x+1 as well as the configuration and status regarding member x. TCMX has also at time Z5 already read the status regarding member x. Thus, at this time, TLCASC writes the new state for member x in RAM_TLCASC and supplies the prior and new state for member x to the TCMX. This output remains stable during cycles Z(5) through Z(4+N). The TCMX changes the status of all other members before changing the status of x at time Z(4+N).

Referring once again to FIG. 2, the individual components will be described in greater functional detail. The TSQE block 32 is the interface between LCAS processing (FIG. 1) which runs on a locally generated time wheel and the mapper processing which operates on a SONET time signal. The TSQE includes a separate state machine for each VCG (eight state machines according to the presently preferred embodiment). Each member of each VCG is represented by a VT to VCG allocation register entry which is illustrated as Table 4. Note that this structure is stored at each update in CONTEXT_RAM 34 for containers allocated to the VCG.

TABLE 4

| PL_SQ | VCG | CFG | CP_SQ | PL_SQ | VCG | CFG |
|---|---|---|---|---|---|---|
| 6 bits | 3 bits | 3 bits | 8 bits | 6 bits | 3 bits | 3 bits |

The first three fields are the payload configuration which is used by the TPD block 36. The final four fields are the control packet configuration which is used by the TCPG block 38. Two-configurations are used for each member of a VCG because the configuration in the control packet describes the configuration that will be used for payload transport during the next control packet transmission. Control packets are used to synchronize transmission and reception. Each control packet describes the state of the link during the next control packet. Changes are sent in advance so that the receiver can switch to the new configuration as soon as it arrives. At each control packet boundary, payload configuration is replaced by control packet configuration and control packet configuration is updated using VCI_VCT_STATUS content.

The Transmit Control Packet Generator (TCPG) 38 provides a control packet to the mapper (not shown). The control packet includes the frame count (FC) and the sequence indicator (SQ). When appropriate, i.e. during link capacity adjustment, the control packet also includes the control word (CTRL), the group identification (GID), resequence acknowledgment (RS_ACK), member status (MST), and an error check (CRC).

The Transmit Payload Demultiplexer (TPD) 36 reads and writes payload bytes from the payload RAM 40 where the bytes are stored on a per-VCG basis. The RAM 40 is divided into odd zones and even zones. When the odd zone is read, the even zone is simultaneously written and when the even zone is read, the odd zone is simultaneously written. The TPD effectively reorders the sequence of the bytes according to SQ number. Bytes of payload are read from an encapsulation block (not shown) and written into RAM in consecutive order. Bytes of payload are read from RAM using the SQ number. The TPD also provides the mapper with control bytes generated by the TCPG.

Figure 4:
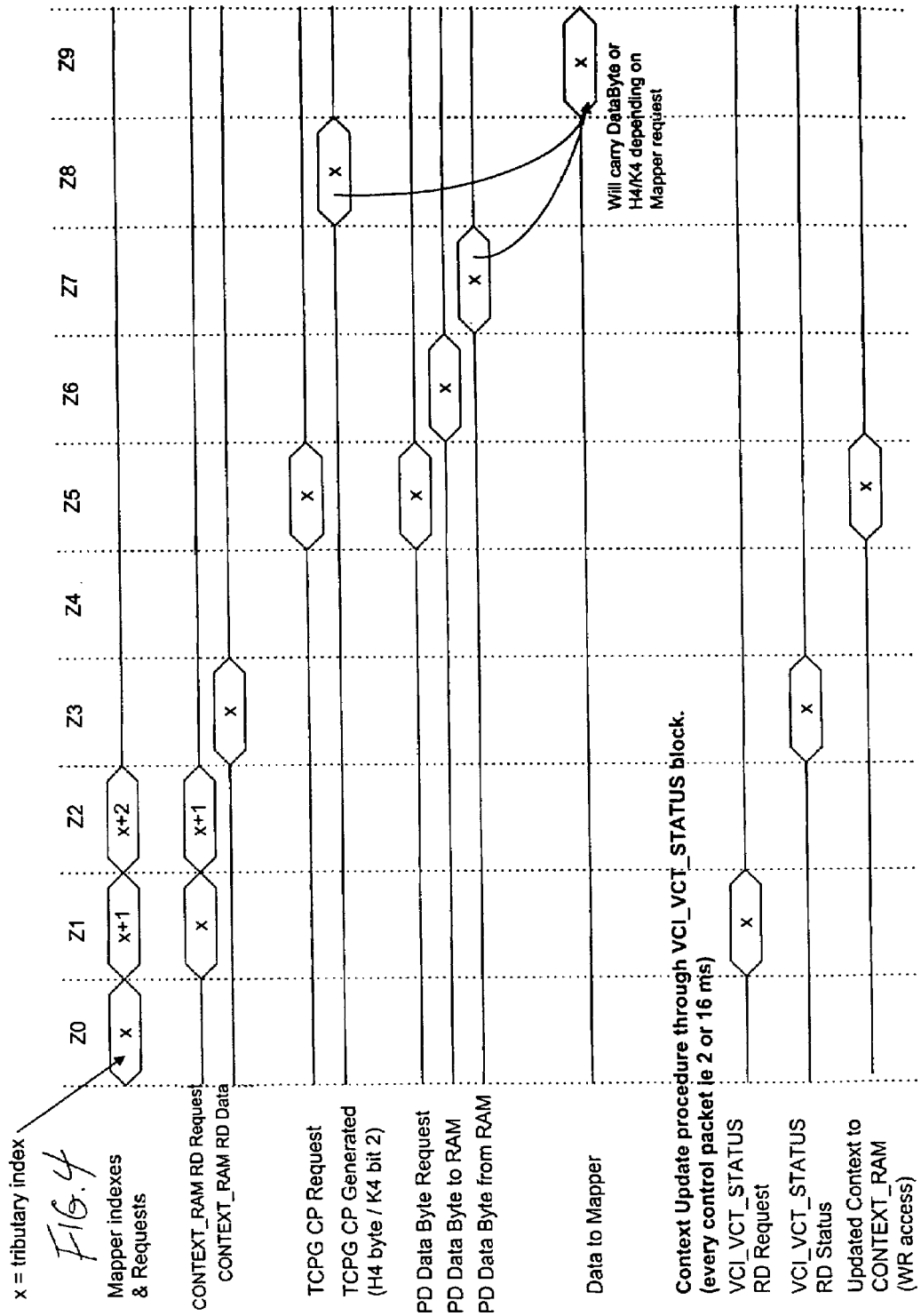
FIG. 4 is a timing diagram of the control packet and payload processing.

FIG. 4 illustrates the timing of the operations described above with reference to FIG. 2. Starting with a mapper request at time Z0, the TSQE issues a context RAM read request and a VCI_VCT_STATUS read request at time Z1 while the mapper continues to make requests in VT order. At time Z3, the context RAM and the VCI_VCT_STATUS are read by the TSQE. At time Z5, updated context is written to the context RAM. At the same time, the TSQE sends a payload byte request to the TPD and a control byte request to the TCPG. A read and write request is sent at time Z6 from the TPD to the payload RAM while the TCPG sends a read request to the VCI_LCAS_GENECONF. At time Z7, a payload byte is read and written. At time Z8, a control packet (if requested) is generated by TCPG and delivered to the TPD. The byte requested by the mapper at Z0 is delivered to the mapper at time Z9.

There have been described and illustrated herein methods and apparatus for the hardware implementation of virtual concatenation and link capacity adjustment over SONET/SDH frames. While particular embodiments of the invention have been described, it is not intended that the invention be limited thereto, as it is intended that the invention be as broad in scope as the art will allow and that the specification be read likewise. It will therefore be appreciated by those skilled in the art that yet other modifications could be made to the provided invention without deviating from its spirit and scope as claimed.

What is claimed is:

1. A method for providing link capacity adjustment scheme (LCAS) for a virtual concatenation group (VCG) having up to N members (where N is positive integer), comprising:
    a) providing a state machine on chip with a SONET/SDH mapper;
    b) maintaining X registers for storing the last state of each member, where X is a positive integer less than or equal to N;
    c) providing X status registers for maintaining the present status of each member;
    d) updating the status registers with the state machine based on the last state of a member and network management commands, wherein
    the status registers are updated in N clock cycles.
2. The method according to claim 1, wherein:
    the state machine is a single state machine shared by all of the members.
3. The method according to claim 2, wherein:
    the status of each member is updated one after the other.
4. A method for providing link capacity adjustment scheme (LCAS) for a virtual concatenation group (VCG) having up to N members (where N is positive integer), comprising:
    a) providing a state machine on chip with a SONET/SDH mapper;
    b) maintaining X registers for storing the last state of each member, where X is a positive integer less than or equal to N;
    c) providing X status registers for maintaining the present status of each member;
    d) updating the status registers with the state machine based on the last state of a member and network management commands, wherein
    the status registers are updated one after the other.
5. The method according to claim 4, wherein:
    the registers storing the last state of each member and the status registers are, for each member, read at different times.
6. The method according to claim 4, further comprising:
    e) updating the state of one member before updating the status registers of all members;

f) updating the state of a next member after updating the status of all members.

7. The method according to claim 6, further comprising:
g) periodically receiving control packets;
h) reading the status registers in response to receiving control packets.

8. The method according to claim 7, further comprising:
i) providing a context RAM;
j) copying the content of the status registers into context RAM when the status registers are read.

9. The method according to claim 8, further comprising:
k) receiving periodic mapper requests;
l) reading the context RAM in response to mapper requests.

10. The method according to claim 9, further comprising:
m) if the mapper request is for a payload byte, reading a payload byte subsequent to reading the context RAM;
n) if the mapper request is for a control packet, generating a control packet after reading the context RAM.

11. In a SONET/SDH mapper, an apparatus for providing link capacity adjustment scheme (LCAS) for a virtual concatenation group (VCG) having up to N members (where N is positive integer), comprising:
a) a state machine on chip with the SONET/SDH mapper;
b) X registers for storing the last state of each member, where X is a positive integer less than or equal to N;
c) X status registers for maintaining the present status of each member, wherein
the status registers are updated in N clock cycles with the state machine based on the last state of a member and network management commands.

12. The apparatus according to claim 11, wherein:
the state machine is a single state machine shared by all of the members.

13. The apparatus according to claim 12, wherein:
the status of each member is updated one after the other.

14. In a SONET/SDH mapper, an apparatus for providing link capacity adjustment scheme (LCAS) for a virtual concatenation group (VCG) having up to N members (where N is positive integer), comprising:
a) a state machine on chip with the SONET/SDH mapper;
b) X registers for storing the last state of each member, where X is a positive integer less than or equal to N;
c) X status registers for maintaining the present status of each member, wherein the status registers are updated one after the other with the state machine based on the last state of a member and network management commands.

15. The apparatus according to claim 14, wherein:
the registers storing the last state of each member and the status registers are, for each member, read at different times.

16. The apparatus according to claim 14, wherein:
the state of one member is updated before the status registers of all members are updated, and
the state of a next member is updated after the status registers of all members are updated.

17. The apparatus according to claim 16, wherein:
the status registers are read in response to receiving control packets.

18. The apparatus according to claim 17, further comprising:
d) a context RAM, wherein
the content of the status registers is copied into context RAM when the status registers are read.

19. The apparatus according to claim 18, wherein:
the context RAM is read in response to mapper requests.

20. The apparatus according to claim 19, wherein:
if a mapper request is for a payload byte, a payload byte is read subsequent to reading the context RAM, and
if the mapper request is for a control packet, control packet is generated after reading the context RAM.

* * * * *

UNITED STATES PATENT AND TRADEMARK OFFICE
CERTIFICATE OF CORRECTION

PATENT NO. : 7,020,158 B2  Page 1 of 1
APPLICATION NO. : 10/900737
DATED : March 28, 2006
INVENTOR(S) : Christophe Rouaud It is certified that error appears in the above-identified patent and that said Letters Patent is hereby corrected as shown below:

Title Page, Item (45) Date of Patent should read: *March 28, 2006

Signed and Sealed this

Thirtieth Day of October, 2012

David J. Kappos
*Director of the United States Patent and Trademark Office*